United States Patent
Agombar et al.

(10) Patent No.: US 10,303,392 B2
(45) Date of Patent: May 28, 2019

(54) TEMPERATURE-BASED DISK DEFRAGMENTATION

(71) Applicant: International Business Machines Corporation, Armonk, NY (US)

(72) Inventors: John P. Agombar, Winchester (GB); Ian Boden, Eastleigh (GB); Alastair Cooper, Winchester (GB); Gordon D. Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 15/283,753

(22) Filed: Oct. 3, 2016

(65) Prior Publication Data
US 2018/0095695 A1 Apr. 5, 2018

(51) Int. Cl.
*G06F 1/20* (2006.01)
*G06F 3/06* (2006.01)
*G06F 12/02* (2006.01)

(52) U.S. Cl.
CPC ............ *G06F 3/0647* (2013.01); *G06F 3/061* (2013.01); *G06F 3/0644* (2013.01); *G06F 3/0653* (2013.01); *G06F 3/0676* (2013.01); *G06F 12/02* (2013.01); *G06F 1/20* (2013.01); *G06F 2212/1016* (2013.01)

(58) Field of Classification Search
None
See application file for complete search history.

(56) References Cited

U.S. PATENT DOCUMENTS

| | | | |
|---|---|---|---|
| 7,281,106 B1 * | 10/2007 | Aman | G06F 3/061 711/112 |
| 8,832,410 B2 | 9/2014 | Springberg | |
| 8,838,887 B1 * | 9/2014 | Burke | G06F 3/0611 711/112 |
| 9,244,618 B1 | 1/2016 | Martin et al. | |
| 2008/0091877 A1 * | 4/2008 | Klemm | G06F 3/061 711/114 |
| 2011/0197046 A1 * | 8/2011 | Chiu | G06F 3/0617 711/171 |
| 2012/0159097 A1 * | 6/2012 | Jennas, II | G06F 3/0611 711/162 |
| 2012/0278668 A1 * | 11/2012 | Chiu | G06F 12/02 714/700 |
| 2013/0151683 A1 * | 6/2013 | Jain | G06F 3/0611 709/223 |

* cited by examiner

*Primary Examiner* — Michael Alsip
*Assistant Examiner* — Ralph A Verderamo, III
(74) *Attorney, Agent, or Firm* — Nelson and Nelson; Daniel P. Nelson; Alexis V. Nelson

(57) ABSTRACT

A method for minimizing head seek movement and improving I/O performance of a hard disk drive is disclosed. In one embodiment, such a method includes logically dividing storage space of a hard disk drive into storage areas of substantially equal size. The method monitors a temperature of each of the storage areas. The temperature indicates how frequently data in a corresponding storage area is accessed. The method swaps data in storage areas of the hard disk drive based on temperature. These swaps involve moving hotter data toward outer tracks of the disk drive and colder data toward inner tracks of the disk drive. A corresponding system and computer program product are also disclosed.

20 Claims, 8 Drawing Sheets

TEMPERATURE-BASED DISK DEFRAGMENTATION

BACKGROUND

Field of the Invention

This invention relates to systems and methods for minimizing head seek movement and improving I/O performance of hard disk drives.

Background of the Invention

In today's storage architectures, hard disk drives are used extensively to store data. Such hard disk drives may provide most of the storage in many of today's tiered storage architectures. In such architectures, the "hotness" or "coldness" of data may be continually monitored so that it can be optimally placed on storage media. For example, "hot" (i.e., frequently accessed) data may be placed on faster, more expensive storage media (e.g., solid state drives) to improve I/O performance. "Cold" (i.e., less frequently accessed) data may be placed on slower, less expensive storage media (e.g., hard disk drives) with reduced I/O performance. As the temperature of the data changes, the data may be migrated between storage tiers to optimize I/O performance.

Although significant emphasis has been placed on moving data between storage tiers of a tiered storage system, little or no emphasis has been placed on efficiently moving data within a hard disk drive itself. As known to those of skill in the art, a hard disk drive typically includes one or more rotating disks (platters) coated with magnetic material. Magnetic heads mounted to a moving actuator arm may be used to read from and write to the platter surfaces. Due to the faster linear velocity of the outer tracks of the platters and the positioning of the heads and actuator arms, reading and writing from the outer tracks is typically must faster than reading and writing data from inner tracks. In some cases, reading and writing to the outer tracks may be many times, in some cases four or five times, as fast as reading and writing to the inner tracks. For this reason, critical and/or important data such as operating system files may be stored on the outer tracks of a hard disk drive to improve I/O performance. Once stored, however, this data typically stays at or near its original location regardless of how frequently the data is accessed.

In view of the foregoing, what are needed are systems and methods to more efficiently place data within a hard disk drive. Ideally such systems and methods will minimize head seek movement and improve I/O performance of the hard disk drive.

SUMMARY

The invention has been developed in response to the present state of the art and, in particular, in response to the problems and needs in the art that have not yet been fully solved by currently available systems and methods. Accordingly, the invention has been developed to minimize head seek movement and improve the I/O performance of hard disk drives. The features and advantages of the invention will become more fully apparent from the following description and appended claims, or may be learned by practice of the invention as set forth hereinafter.

Consistent with the foregoing, a method for minimizing head seek movement and improving I/O performance of a hard disk drive is disclosed herein. In one embodiment, such a method includes logically dividing storage space of a hard disk drive into storage areas of substantially equal size. The method monitors a temperature of each of the storage areas, where the temperature indicates how frequently data in a corresponding storage area is accessed. The method swaps data in storage areas of the hard disk drive based on temperature. These swaps involve moving hotter data toward outer tracks of the disk drive and colder data toward inner tracks of the disk drive. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
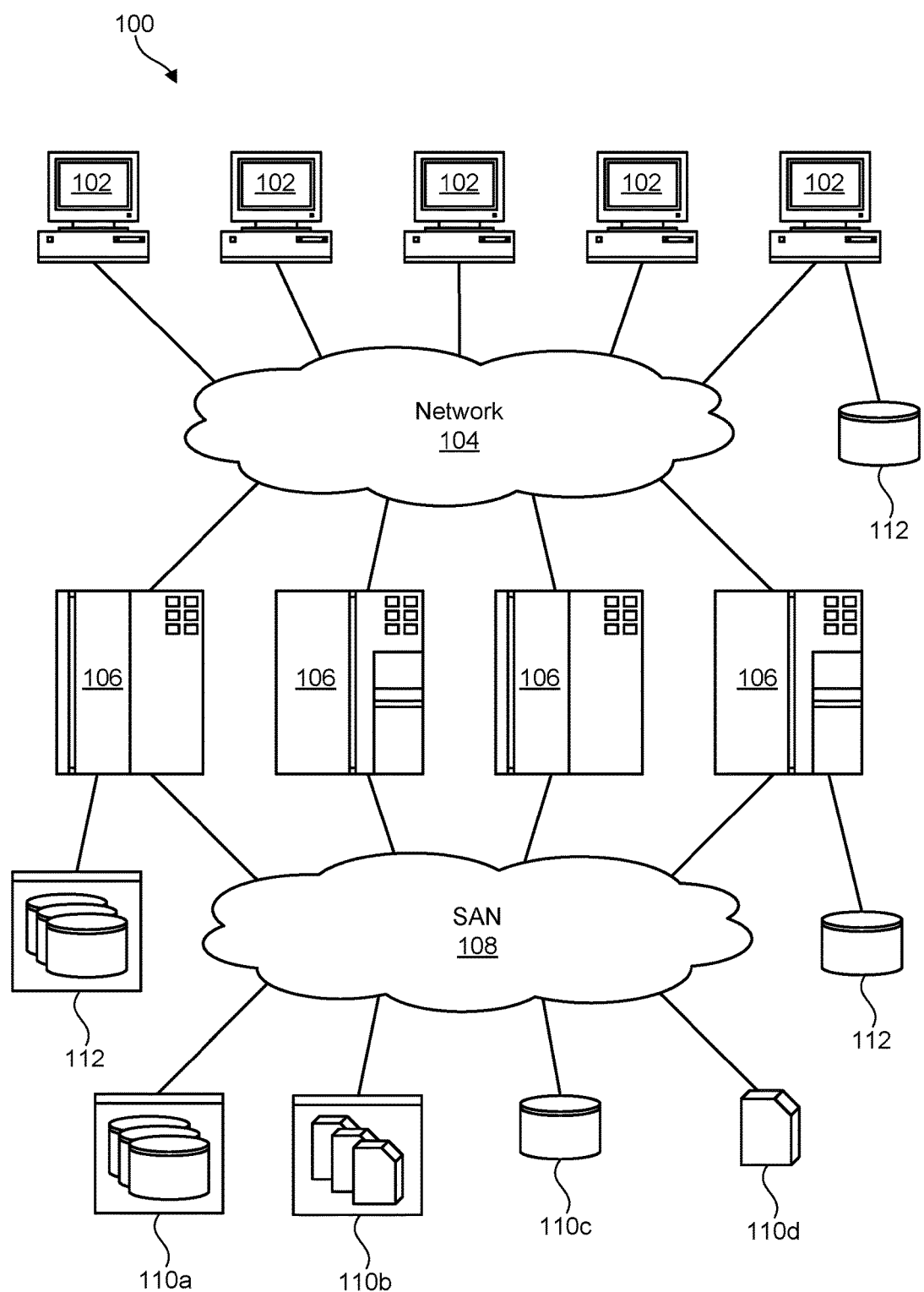
FIG. 1 is a high-level block diagram showing one example of a network environment comprising arrays of storage drives such as hard disk drives.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
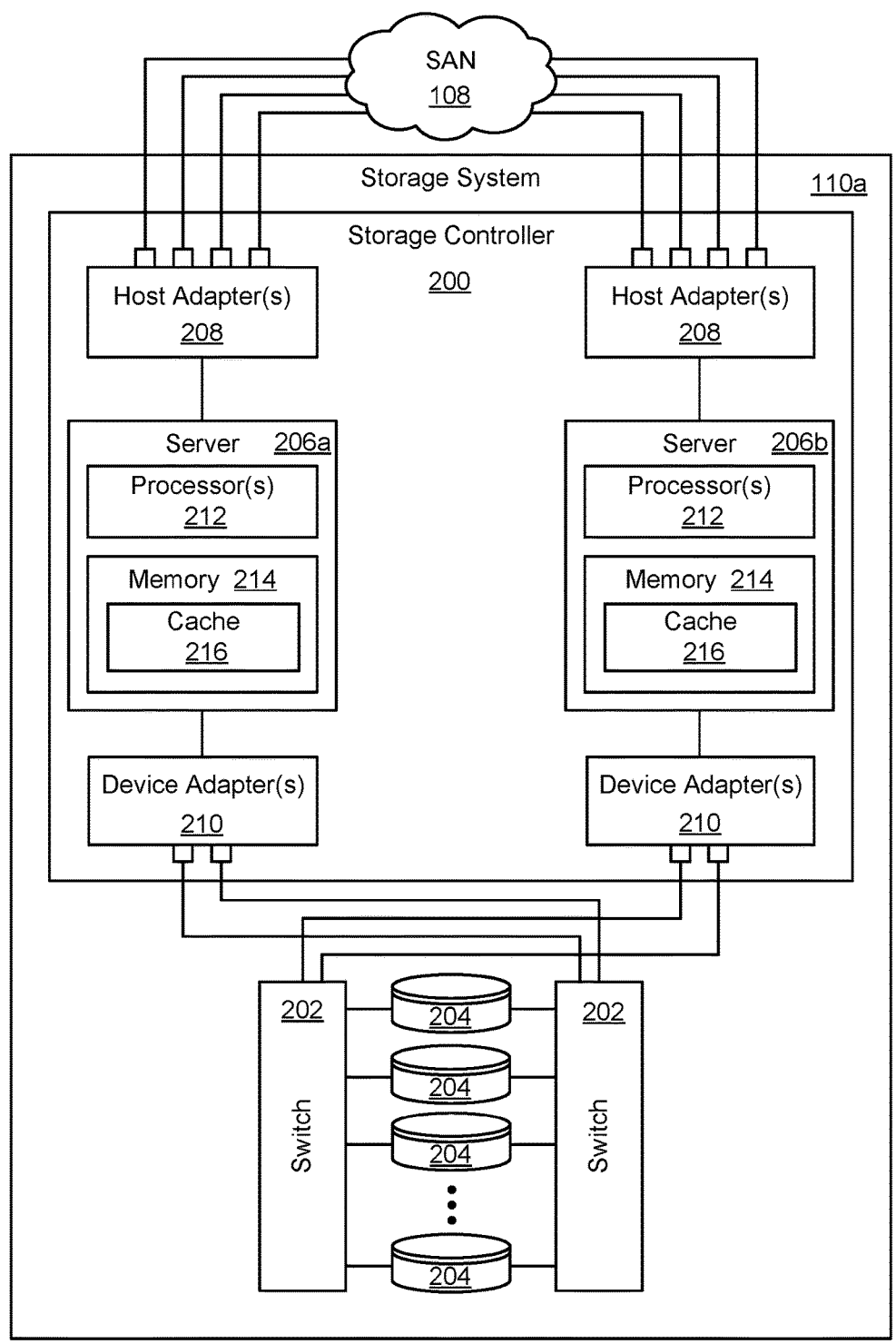
FIG. 2 is a high-level block diagram showing one embodiment of a storage system providing an array of storage drives, such as hard disk drives.

Referring to FIG. 2, one example of a storage system 110a containing an array of hard-disk drives 204 and/or solid-state drives 204 is illustrated. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
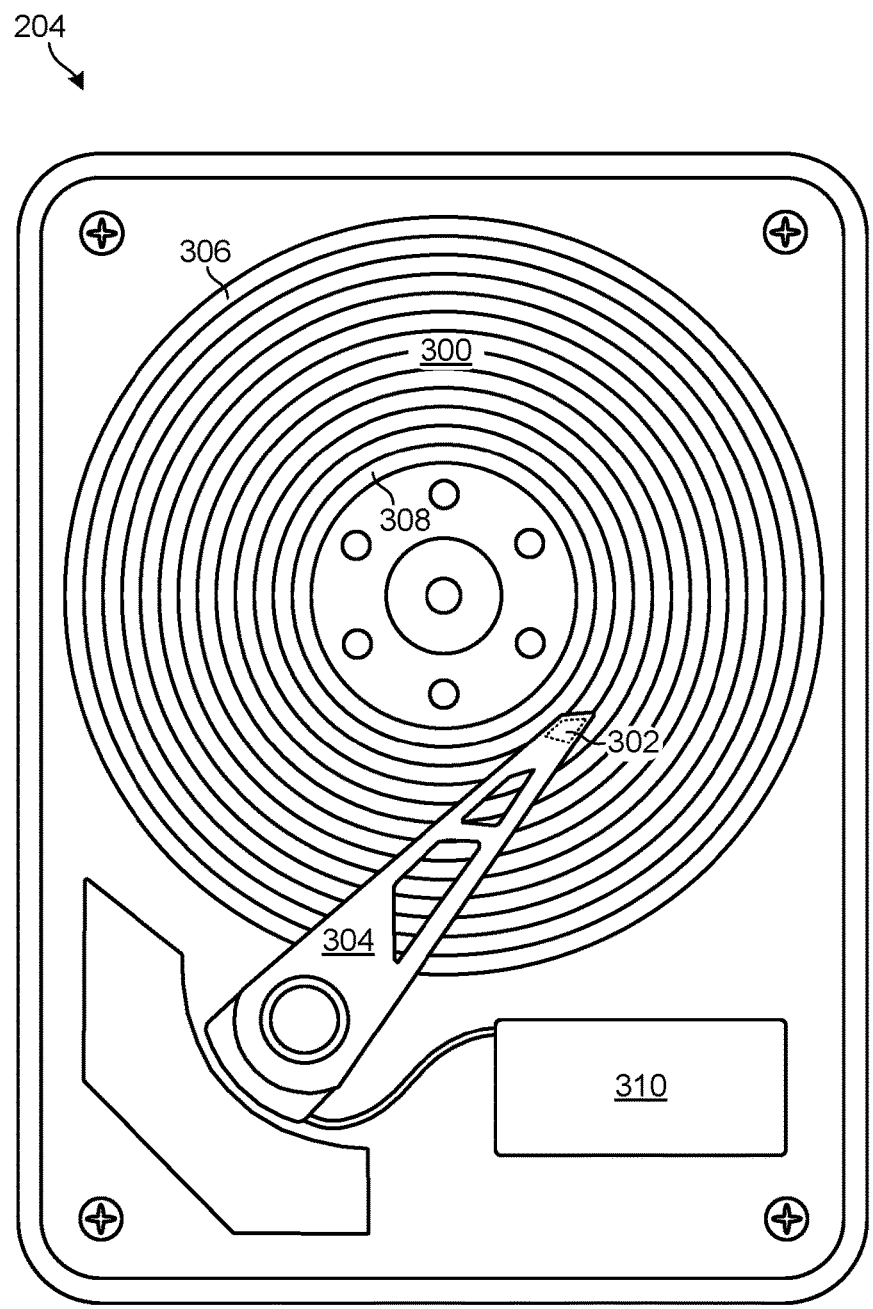
FIG. 3 is a high-level diagram showing internal components of a hard disk drive.

Referring to FIG. 3, a high-level diagram showing internal components of a hard disk drive 204 is illustrated. As known to those of skill in the art, a hard disk drive 204 typically includes one or more rotating disks 300, also referred to as platters 300, coated with magnetic material. Magnetic heads 302 mounted to a moving actuator arm 304 are used to read and write data to the platter surfaces. Due to the circular shape of the spinning platters 300 and the positioning of the heads 302 and actuator arms 304, reading and writing from outer tracks 306 of the spinning platters is typically must faster than reading and writing data from inner tracks 308 of the platters. In some cases, reading and writing to the outer tracks 306 is many times, in some cases four or five times, as fast as reading and writing data to the inner tracks 308. For this reason, critical and/or important data such as operating system files are often stored on the outer tracks 306 of a hard disk drive 204 to improve I/O performance. Once stored, however, this data typically stays at or near its original location regardless of how frequently the data is accessed.

As further shown in FIG. 3, the hard disk drive 204 may include a controller 310 to enable external components (e.g., a processor) to read from and write to the disk platters 300. This controller 310 may also act as a bus that connects the hard disk drive 204 to external components. The controller's primary function may be to translate instructions received from external components such as processors into signals that can be understood by the hard disk drive's internal components, and vice versa. Instructions from a processor may flow through a hard disk adapter, to a hard disk interface, and then onto the controller 310, which may send commands to internal disk drive components in order to perform a particular operation.

Figure 4:
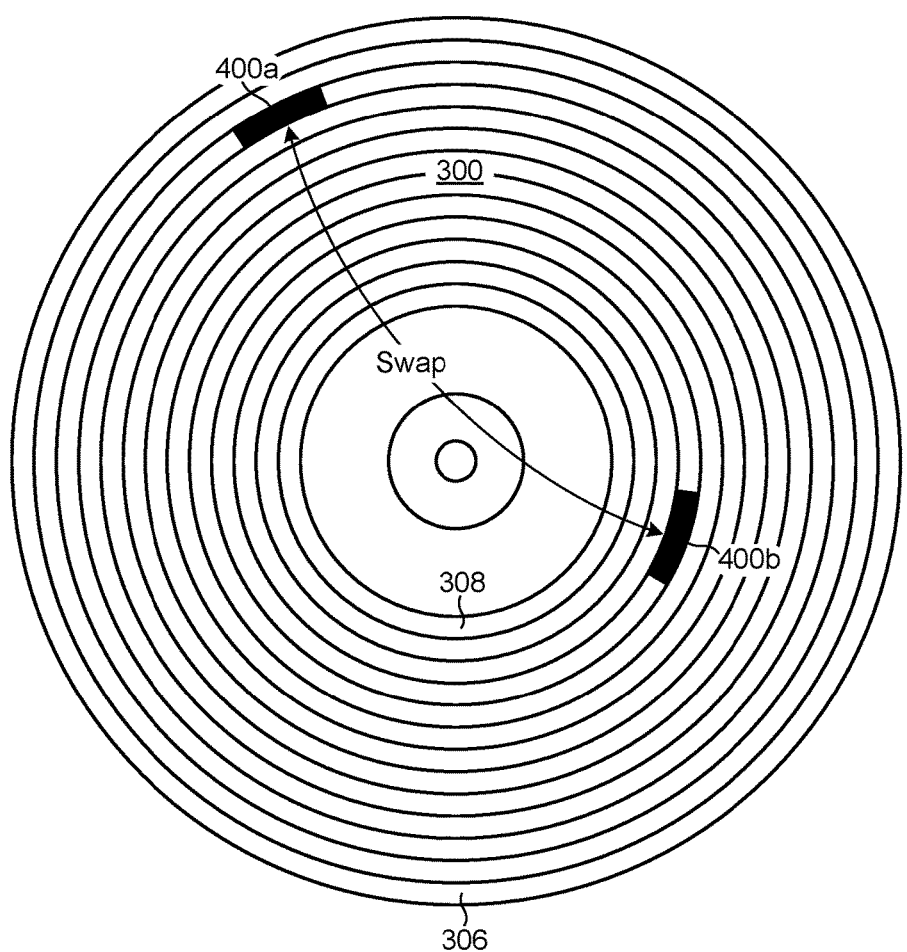
FIG. 4 is a high-level block diagram showing swapping of data in storage areas of a hard disk drive.

Referring to FIG. 4, in order to reduce head seek movement and improve I/O performance of the hard disk drive 204, data within the hard disk drive 204 may be organized based on the temperature of the data contained therein. In essence, data in the hard disk drive 204 may be defragmented based on temperature. Hotter data may be moved toward outer tracks 306 of the hard disk drive 204 and colder data may be moved toward inner tracks 308. As the temperature of the data changes, the data may be migrated between tracks of the hard disk drive 204. By placing hotter data on outer tracks 306 of the hard disk drive 204, I/O performance may be significantly improved for the hotter data and head seek movement may be reduced. Storage areas that tend to be written to or read from together but perhaps had data placed on them at different times and were thus placed at different locations may have similar temperature and thus be more likely to be co-located on the same or adjacent tracks once data on the hard disk drive 204 is reorganized based on temperature. For such storage areas, the "next" I/O is more likely to be nearby in terms of head seek distance, thereby reducing total head movement while preserving sequential I/O performance.

In order to accomplish the above-described temperature-based reorganization, storage space of the hard disk drive 204 may be logically divided into storage areas 400 of substantially equal size. These storage areas 400 may be already existing sectors of the hard disk drive 204, or other divisions or chunks of contiguous storage space. Temperature may then be monitored for each of the storage areas 400, where the temperature corresponds to how frequently data is accessed in the storage area 400. In certain embodiments, each storage area 400 may be assigned a temperature score between 0 and 255, where 0 is the coldest possible value and 255 is the hottest possible value. Based on the temperature of the storage areas 400, systems and methods in accordance with the invention may swap data in the storage areas 400 to move hotter data toward outer tracks 306 of the disk drive 204, and relatively colder data toward inner tracks 308 of the disk drive 204.

For example, assume that the filled areas 400a, 400b are storage areas 400a, 400b for which temperature is monitored. As can be observed, the storage area 400a is closer to an outer track 306 of the platter 300 than is the storage area 400b. If storage area 400b is determined to contain hotter data than storage area 400a, the data in the storage areas

400*a*, 400*b* may be swapped. This will move hotter data toward outer tracks 306 of the platter 300 and colder data toward inner tracks 308 of the platter 300.

In order to perform the swap shown in FIG. 4, data in one of the storage areas 400*a*, 400*b* may be moved to an intermediate area such as into memory of the controller 310, memory of the storage control unit 200, or another empty storage area 400 of the platter 300. This will allow the other storage area 400*a*, 400*b* to be moved to its destination on the platter 300. The other storage area 400*a*, 400*b* may then be moved from the intermediate area to its destination on the platter 300. Upon swapping data in the storage areas 400*a*, 400*b*, a logical address associated with storage area 400*b* may be remapped to point to storage area 400*a*, and a logical address associated with storage area 400*a* may be remapped to point to storage area 400*b*. Thus, from the perspective of devices or systems external to the hard disk drive 204, the data may remain in the same location. All changes may occur internal to the hard disk drive 204 in a way that is transparent to external systems and devices.

Figure 5:
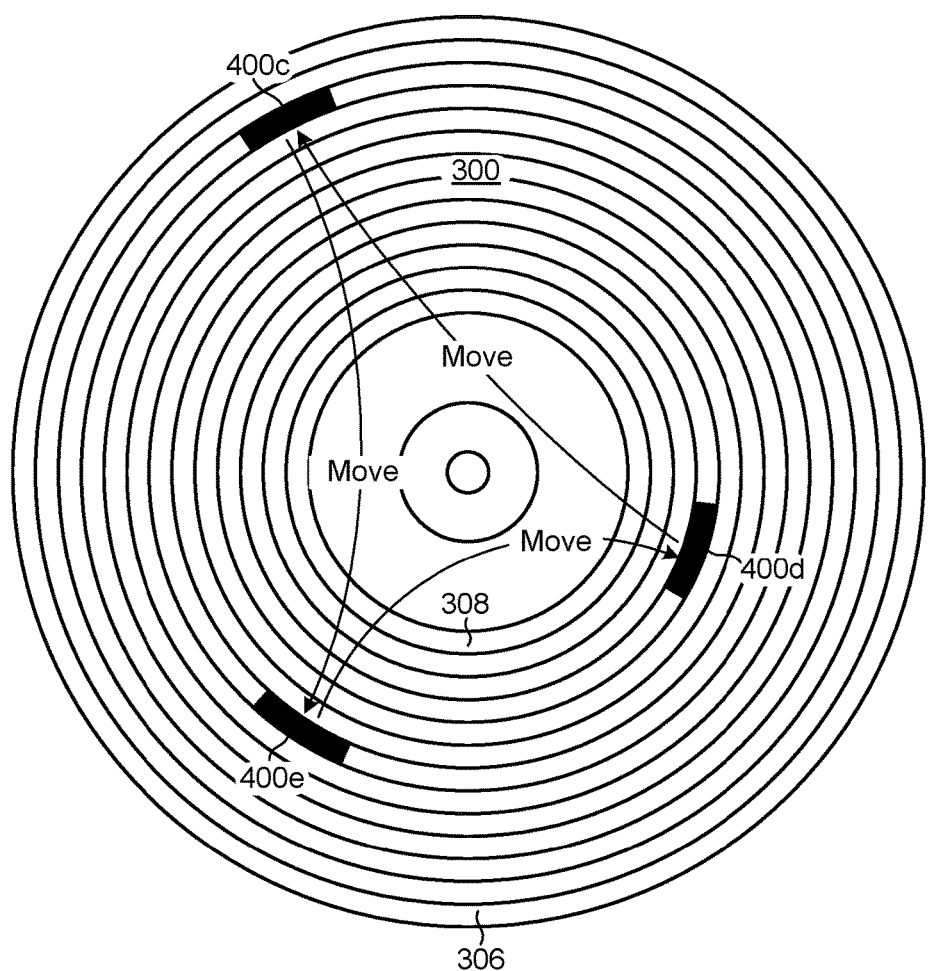
FIG. 5 is a high-level block diagram showing an alternative method for moving data between storage areas of a hard disk drive.

Referring to FIG. 5, the swapping technique disclosed in FIG. 5 may be taken a step further to enable other methods for reorganizing data within a hard disk drive 204. For example, instead of or in addition to swapping data in the storage areas 400, data may be moved around in other ways. FIG. 5 shows movement of data between three storage areas 400*c*, 400*d*, 400*e* to move hotter data toward outer tracks 306 of the platter 300 and cooler data toward inner tracks 308 of the platter 300. This technique may be extended to include additional storage areas 400 beyond the three shown. Such a technique, like the swapping technique described in association with FIG. 4, may utilize an intermediate storage area to facilitate data movement. The intermediate storage area may enable a storage area 400 to be cleared to enable new data to be written thereto. Data may then be written to the storage area 400 that had its data moved, and so forth.

Figure 6:
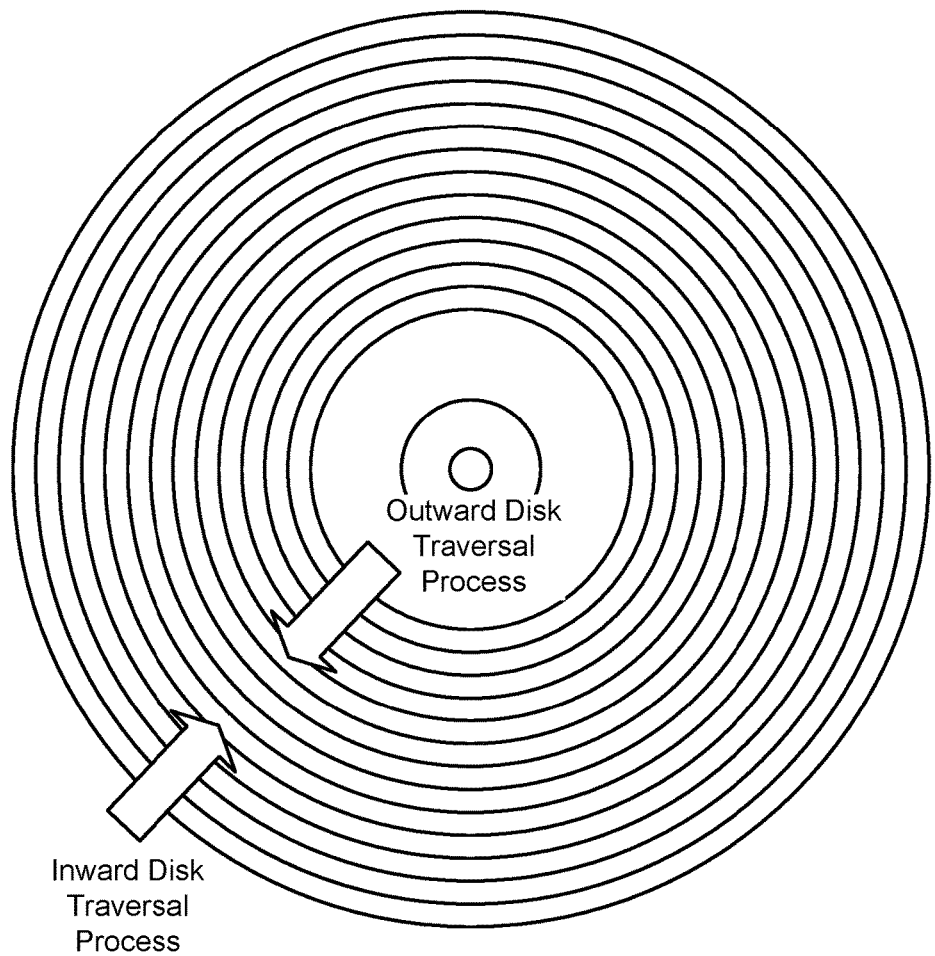
FIG. 6 is a high-level block diagram showing a disk traversal process that proceeds from an outer track of a platter and an inner track of the platter.

Referring to FIG. 6, in order to migrate hotter data toward outer tracks 306 of the platter 300 and colder data toward inner tracks 308 of the platter 300, a disk traversal process may traverse the platter 300 starting from an outer track 306 of the platter 300 and proceeding inward, and starting from an inner track 308 of the platter 300 and proceeding outward. The disk traversal process may look for colder storage areas 400 (compared to an average temperature of storage areas 400 on the platter 300) near the outer tracks 306 of the platter 300 and hotter storage areas 400 (compared to an average temperature of storage areas 400 on the platter 300) near the inner tracks 308 of the platter 300. These storage areas 400 may be good candidates for swapping data.

A benefit score may then be calculated for each potential swap. This benefit score may be based on temperature scores of the storage areas 400 to be swapped, as well as locations of the storage areas 400 on the platter 300. The benefit score of a swap may, in certain embodiments, be the sum of the benefit achieved from each of the two moves, where each benefit may be valued by an individual mismatch between an ideal location (based on heat) and an actual location, and the current location of the swap partner in terms of distance from the ideal location that the data in a storage area 400 could potentially be moved if swapped with the swap partner. The benefit scores from each of these potential swaps may be organized from largest to smallest. Swaps with a larger benefit score will be performed first since these will reduce head seek movement and improve I/O performance the most. In other words, swaps may be performed from largest benefit score to smallest benefit score. In certain embodiments, swaps will only be performed for storage areas 400 satisfying a minimum benefit score.

Figure 7:
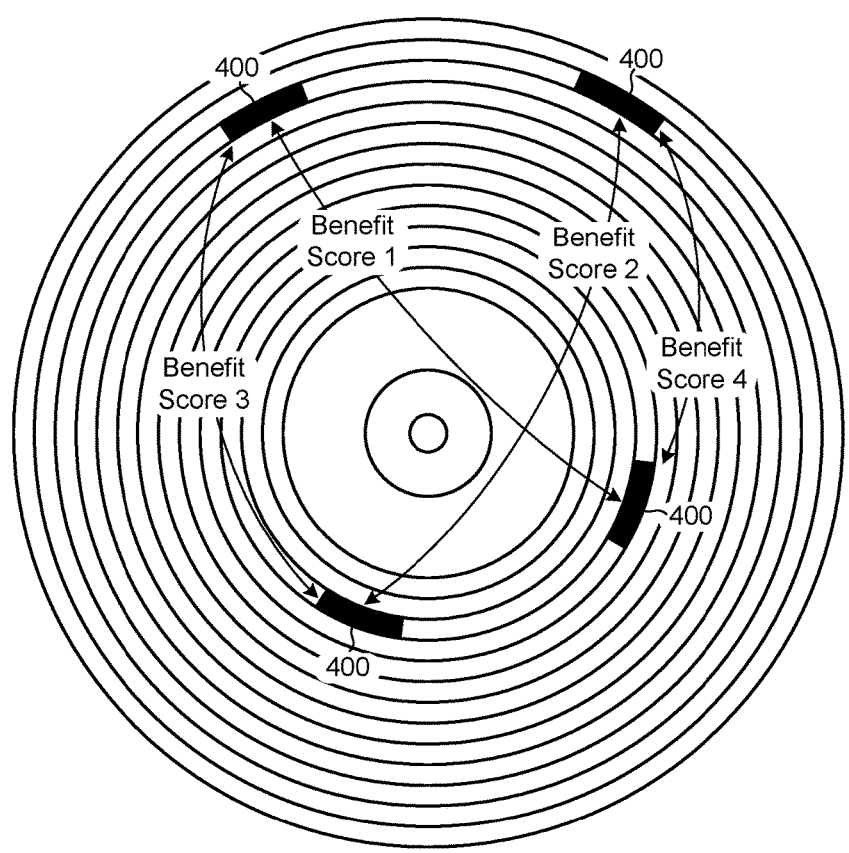
FIG. 7 is a high-level block diagram showing calculation of benefit scores for potential swaps.

FIG. 7 shows various potential swaps and their associated benefit scores, in this example generically labeled as Benefit Scores 1, 2, 3, and 4. As shown, a single storage area 400 may generate a different benefit score based on which other storage area 400 it is paired with. Swaps having the highest benefit score may be performed first followed by swaps with lesser benefit scores.

Figure 8:
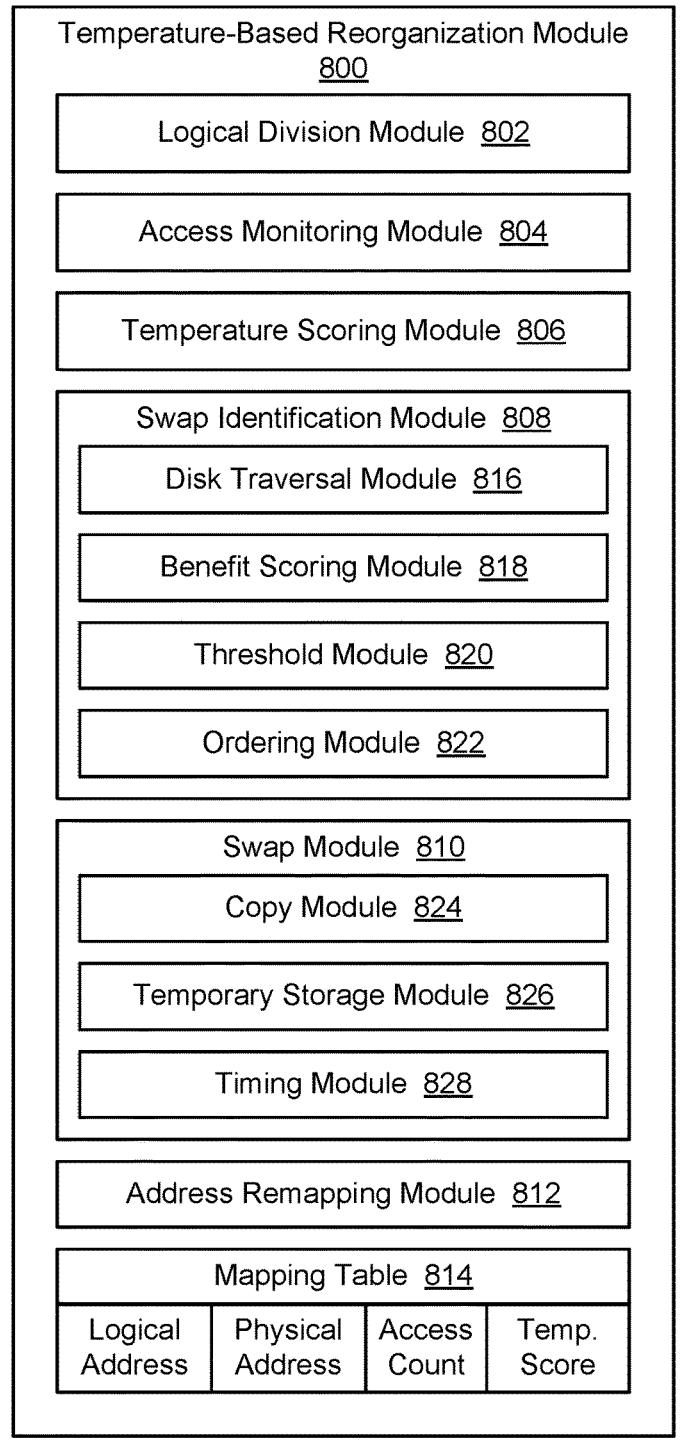
FIG. 8 is a high-level block diagram of a temperature-based reorganization module for implementing functionality associated with the invention.

Referring to FIG. 8, the functionality described in association with FIGS. 3 through 7 may be implemented by a temperature-based reorganization module 800 in accordance with the invention. The temperature-based reorganization module 800 may be implemented in hardware, software, firmware, or a combination thereof. In certain embodiments, functionality of the temperature-based reorganization module 800 is implemented within a controller 310 of a hard disk drive 204. In such embodiments, the temperature-based data reorganization may be performed within the hard disk drive 204 in a way that is seamless to outside systems/devices. In other embodiments, functionality of the temperature-based reorganization module 800 is implemented all or partly outside of a hard disk drive 204, such as in a storage control unit 200. For example, a temperature-based reorganization module 800 in the storage control unit 200 may monitor temperature of storage areas 400 in a hard disk drive 204, read data in the storage areas 400, and write the data to new storage areas 400 within the hard disk drive 204 to improve I/O performance and reduce head seek movement. In yet other embodiments, functionality of the temperature-based reorganization module 800 is implemented both inside and outside of a hard disk drive 204. That is, some functionality may be implemented within the hard disk drive 204, while other functionality is implemented outside of the hard disk drive 204.

In order to implement the functionality of the temperature-based reorganization module 800, the temperature-based reorganization module 800 may include various sub-modules. These sub-modules may include one or more of a logical division module 802, access monitoring module 804, temperature scoring module 806, swap identification module 808, swap module 810, and address remapping module 812. The swap identification module 808 may include one of more of a disk traversal module 816, benefit scoring module 818, threshold module 820, and ordering module 822. The swap module 810 may include one or more of a copy module 824, temporary storage module 826, and timing module 828. A mapping table 814 may be used to map the logical addresses of storage areas 400 to physical addresses on the platter 300, and maintain data such as an access count and temperature score for each storage area 400.

The logical division module 802 may logically divide storage space of the hard disk drive 204 into storage areas 400 of substantially equal size. As previously mentioned, these storage areas 400 may be sectors of the hard disk drive 204, or other divisions or chunks of storage space. The access monitoring module 804 may then monitor access (i.e., reads and writes) to each of the storage areas 400. In certain embodiments, the access monitoring module 804 maintains an access count for each storage area 400 in the mapping table 814 or in another data structure. Each time a storage area 400 is accessed, the access count may be incremented. In certain embodiments, the access count is maintained for a select period or decision window to determine the temperature of the data over that period or decision window. Alternatively, or additionally, the access count may be decayed (i.e., decremented) by a specified amount every fixed unit of time.

Based on the access count, the temperature scoring module 806 may calculate a temperature score. As previously mentioned, in certain embodiments, this temperature score may be a value between 0 and 255, where 0 is a coldest temperature and 255 is a hottest temperature. Other values or ranges of values are possible and within the scope of the invention.

The swap identification module 808 may identify potential swaps of data on the hard disk drive platter 300. To accomplish this, the disk traversal module 816 may traverse the platter 300 starting from an outer track 306 of the platter 300 and proceeding inward, and starting from an inner track 308 of the platter 300 and proceeding outward. While traversing the platter 300 in this manner, the disk traversal module 816 may search for colder storage areas 40 near outer tracks 306 of the platter 300 and hotter storage areas 400 near inner tracks 308 of the platter 300. These storage areas 400 will be good candidates for swapping. In certain embodiments, the disk traversal module 816 may skip over storage areas 400 that are too "young" to have reliable statistics.

The benefit scoring module 818 may calculate a benefit score for each potential swap on the platter 300. In certain embodiments, only swaps providing a minimum benefit may be considered. The threshold module 820 may filter out swaps that do meet this minimum threshold. Once a benefit score is calculated for each potential swap, the ordering module 822 may order the swaps by benefit score, such as from largest to smallest.

Once benefit scores are calculated, the swap module 810 may perform the swaps in order of greatest benefit as a background task. To perform each swap, the temporary storage module 826 may allocate an intermediate storage area. The copy module 824 may then copy data between the storage areas 400. In order to swap data in two storage areas 400 (i.e., a first storage area 400 and a second storage area 400), the copy module 824 may copy the data from the first storage area 400 into the intermediate storage area and then copy the data from the second storage area 400 into the first storage area 400. The copy module 824 may then copy the data from the intermediate storage area into the first storage area 400. The intermediate storage area may reside in memory of the hard disk drive controller 310, on the platter 300 itself, or in a location external to the hard disk drive 204, such as in the storage control unit memory 214. The copy module 824 is not limited to the techniques described above and may use other techniques for copying data where appropriate, such as when moving data between more than two storage areas 400.

The timing module 828 may control when data in storage areas 400 is swapped. Because one of the goals of swapping data is to improve I/O performance of the hard disk drive 204, it may be self-defeating to swap data during periods of peak I/O since this may compete with actual I/O and undermine I/O performance. Thus, the timing module 828 may schedule swaps or other data reorganization during periods of reduced I/O so as not to overly reduce the I/O performance of actual I/O occurring to the hard disk drive 204.

Once data in a storage area 400 is moved to a new storage area 400, the address remapping module 812 may remap the logical address associated with the data to point to the new storage area 400. This may be accomplished by updating the mapping table 814 to associate the logical address with the new physical location on the platter 300. As previously mentioned, to external devices and systems, the data may be located at the same logical address.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for minimizing head seek movement and improving I/O performance in a disk drive, the method comprising:
    logically dividing storage space of a disk drive into storage areas of substantially equal size, where each storage area is characterized by a temperature describing an access frequency of data within the storage area;
    determining a plurality of swaps, wherein a swap comprises exchanging data in at least two of the storage areas;
    calculating a benefit score for each of the swaps, wherein the benefit score is a function of the temperature of the storage areas being swapped as well as the physical locations of the storage areas on a platter of the disk drive;
    ordering the swaps by benefit score; and
    executing swaps in the order of benefit score.

2. The method of claim 1, wherein executing a swap comprises moving data from a source storage area to a destination storage area.

3. The method of claim 2, further comprising, upon moving the data from the source storage area to the destination storage area, remapping a logical address associated with the source storage area to the destination storage area.

4. The method of claim 1, further comprising monitoring the temperature of each of the storage areas.

5. The method of claim 1, wherein the benefit score is at least partially derived from a sum of a benefit achieved from moving data in each of the storage areas, where each benefit is valued by an individual mismatch between an ideal physical location of the data based on temperature, and an actual physical location of the data that would result from the move.

6. The method of claim 1, wherein executing swaps comprises executing swaps starting from the highest benefit score.

7. The method of claim 1, wherein executing a swap comprises storing data from at least one of the storage areas participating in the swap in an intermediate location to complete the swap.

8. A computer program product for minimizing head seek movement and improving I/O performance in a disk drive, the computer program product comprising a non-transitory computer-readable storage medium having computer-usable program code embodied therein, the computer-usable program code configured to perform the following when executed by at least one processor:
- logically divide storage space of a disk drive into storage areas of substantially equal size where each storage area is characterized by a temperature describing an access frequency of data within the storage area;
- determine a plurality of swaps, wherein a swap comprises exchanging data in at least two of the storage areas;
- calculate a benefit score for each of the swaps, wherein the benefit score is a function of the temperature of the storage areas being swapped as well as the physical locations of the storage areas on a platter of the disk drive;
- order the swaps by benefit score; and
- execute swaps in the order of benefit score.

9. The computer program product of claim 8, wherein executing a swap comprises moving data from a source storage area to a destination storage area.

10. The computer program product of claim 9, wherein the computer-usable program code is further configured to, upon moving the data from the source storage area to the destination storage area, remap a logical address associated with the source storage area to the destination storage area.

11. The computer program product of claim 8, wherein the computer-usable program code is further configured to monitor the temperature of each of the storage areas.

12. The computer program product of claim 8, wherein the benefit score is at least partially derived from a sum of a benefit achieved from moving data in each of the storage areas, where each benefit is valued by an individual mismatch between an ideal physical location of the data based on temperature, and an actual physical location of the data that would result from the move.

13. The computer program product of claim 8, wherein executing swaps comprises executing swaps starting from the highest benefit score.

14. The computer program product of claim 8, wherein executing a swap comprises storing data from at least one of the storage areas participating in the swap in an intermediate location to complete the swap.

15. A system for minimizing head seek movement and improving I/O performance in a disk drive, the system comprising:
- at least one processor;
- at least one memory device coupled to the at least one processor and storing instructions for execution on the at least one processor, the instructions causing the at least one processor to:
  - logically divide storage space of a disk drive into storage areas of substantially equal size, where each storage area is characterized by a temperature describing an access frequency of data within the storage area;
  - determine a plurality of swaps, wherein a swap comprises exchanging data in at least two of the storage areas;
  - calculate a benefit score for each of the swaps, wherein the benefit score is a function of the temperature of the storage areas being swapped as well as the physical locations of the storage areas on a platter of the disk drive;
  - order the swaps by benefit score; and
  - execute swaps in the order of benefit score.

16. The system of claim 15, wherein executing a swap comprises moving data from a source storage area to a destination storage area.

17. The system of claim 16, wherein the instructions further cause the at least one processor to, upon moving the data from the source storage area to the destination storage area, remap a logical address associated with the source storage area to the destination storage area.

18. The system of claim 15, wherein the instructions further cause the at least one processor to monitor the temperature of each of the storage areas.

19. The system of claim 15, wherein the benefit score is at least partially derived from a sum of a benefit achieved from moving data in each of the storage areas, where each benefit is valued by an individual mismatch between an ideal physical location of the data based on temperature, and an actual physical location of the data that would result from the move.

20. The system of claim 15, wherein executing swaps comprises executing swaps starting from the highest benefit score.

* * * * *